(12) United States Patent
Whalen et al.

(10) Patent No.: US 8,752,642 B2
(45) Date of Patent: Jun. 17, 2014

(54) IMPLEMENT HEIGHT ADJUSTER

(75) Inventors: Patrick Whalen, Colchester, IL (US);
Derek Litchfield, Macomb, IL (US);
Derek Allensworth, Macomb, IL (US)

(73) Assignee: Yetter Manufacturing Company, Colchester, IL (US)

( * ) Notice: Subject to any disclaimer, the term of this patent is extended or adjusted under 35 U.S.C. 154(b) by 326 days.

(21) Appl. No.: 13/033,881

(22) Filed: Feb. 24, 2011

(65) Prior Publication Data

US 2011/0247843 A1    Oct. 13, 2011

Related U.S. Application Data

(60) Provisional application No. 61/308,404, filed on Feb. 26, 2010.

(51) Int. Cl.
*A01B 41/06*    (2006.01)
*A01C 15/00*    (2006.01)

(52) U.S. Cl.
USPC .............................................. 172/2; 111/200

(58) Field of Classification Search
USPC .......... 37/231, 235, 266, 269, 270, 272, 273, 37/276; 172/315, 396, 419, 427, 439, 172/445.1, 445.2, 448, 450, 442, 440, 245, 172/246, 247, 2–9; 280/495, 497, 503; 111/63, 66–69, 18, 22, 200
See application file for complete search history.

(56) References Cited

U.S. PATENT DOCUMENTS

| 5,746,275 | A  | * | 5/1998 | Cross et al. .................... 172/440 |
| 5,950,336 | A  | * | 9/1999 | Liebl ................................. 37/231 |
| 8,291,997 | B2 | * | 10/2012 | Kovach et al. ................. 172/395 |
| 8,360,523 | B2 | * | 1/2013 | Maierhofer et al. ....... 297/284.4 |

* cited by examiner

*Primary Examiner* — Robert Pezzuto
(74) *Attorney, Agent, or Firm* — Barnes & Thornburg LLP; Mark J. Nahnsen

(57) ABSTRACT

An implement height adjuster is provided to allow for the adjustment of the height of an implement remotely from the tractor cab without requiring the user to stop the tractor to make individual adjustments. The implement height adjuster is configured to be coupled to a planter unit or other equipment towed behind a tractor and includes a motor, a gear reduction transmission coupled to the motor, and a flexible output shaft, that is coupled to the transmission at a first end and to the implement to be adjusted at a second end. The flexible output shaft allows the motor of the implement height adjuster to be mounted in various positions on the equipment. The gear reduction transmission or motor includes a position sensor that allows the operator of the tractor to know the position of a particular implement without requiring a visual inspection of the implement. A control panel is used to manage the vertical adjustment of one or a series of implements. The control panel provides power to the implement height adjusters and uses the output signals of the sensor to determine the exact location of each the tillage implement.

14 Claims, 6 Drawing Sheets

IMPLEMENT HEIGHT ADJUSTER

This application claims priority to U.S. Provisional Application Ser. No. 61/308,404 filed Feb. 26, 2010, which is herein incorporated by reference in its entirety.

BACKGROUND

The present disclosure relates to the field of agricultural implements drawn by motive power sources such as tractors used to adjust the height of the agricultural implements. More particularly, the present disclosure relates to a device for remotely adjusting the height of one or more agricultural implements while the farm equipment is in motion. Typical implements include height adjustment settings that are adjusted manually by the tractor operator. Since adjusters of this type are typically located on the planter unit, it can require frequent stops to allow the operator to raise or lower the implement due to changes in soil types and conditions as well as the varying characteristics of the field. Due to the large quantity of acres that may be tilled, frequent stops for adjustment can decrease the number of acres worked per unit of time.

SUMMARY

In accordance with the present disclosure, an on-the-fly implement height adjuster is provided to allow for the adjustment of the height of an implement from the tractor. The present implement height adjuster allows for adjustment of the implement whether the farm equipment is moving or stationary. The height adjuster of the present disclosure can be used on implements used for seeding, fertilizing, strip tillage, cultivating, soil fumigating, crop, tree transplanting, and soil additives.

In illustrative embodiments, the implement height adjuster is configured to be coupled to a planter unit or other equipment towed behind a tractor and includes a motor, a gear reduction transmission coupled to the motor, and a flexible output shaft, that is coupled to the transmission at a first end and to the implement to be adjusted at a second end. The flexible output shaft allows the motor of the implement height adjuster to be mounted in various positions on the equipment and thus can be adapted to equipment units made by various manufacturers.

In illustrative embodiments, the gear reduction transmission or motor includes a position sensor that allows the operator of the tractor to know the position of a particular implement without requiring a visual inspection of the implement. The sensor may include an optical sensor that reads an encoded disc positioned within the transmission. The position sensor may also include a Hall Effect sensor that is used to detect the rotation of a series of magnets so that the position of the tillage implement is known without visual inspection. The flexible output shaft of the implement height adjuster includes a flexible outer jacket, and a flexible inner cable to allow the electric motor and transmission to be mounted in various positions on the planter row unit.

In illustrative embodiments, a control panel may be used to manage the vertical adjustment of one or a series of implements. The control panel may include a visual display that allows the operator of the tractor to know the position of each tillage implement. The control panel has the ability to raise or lower the implements incrementally, individually or all together. The control panel provides power to the implement height adjusters and uses the output signals of the sensor to determine the exact location of each the tillage implement.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
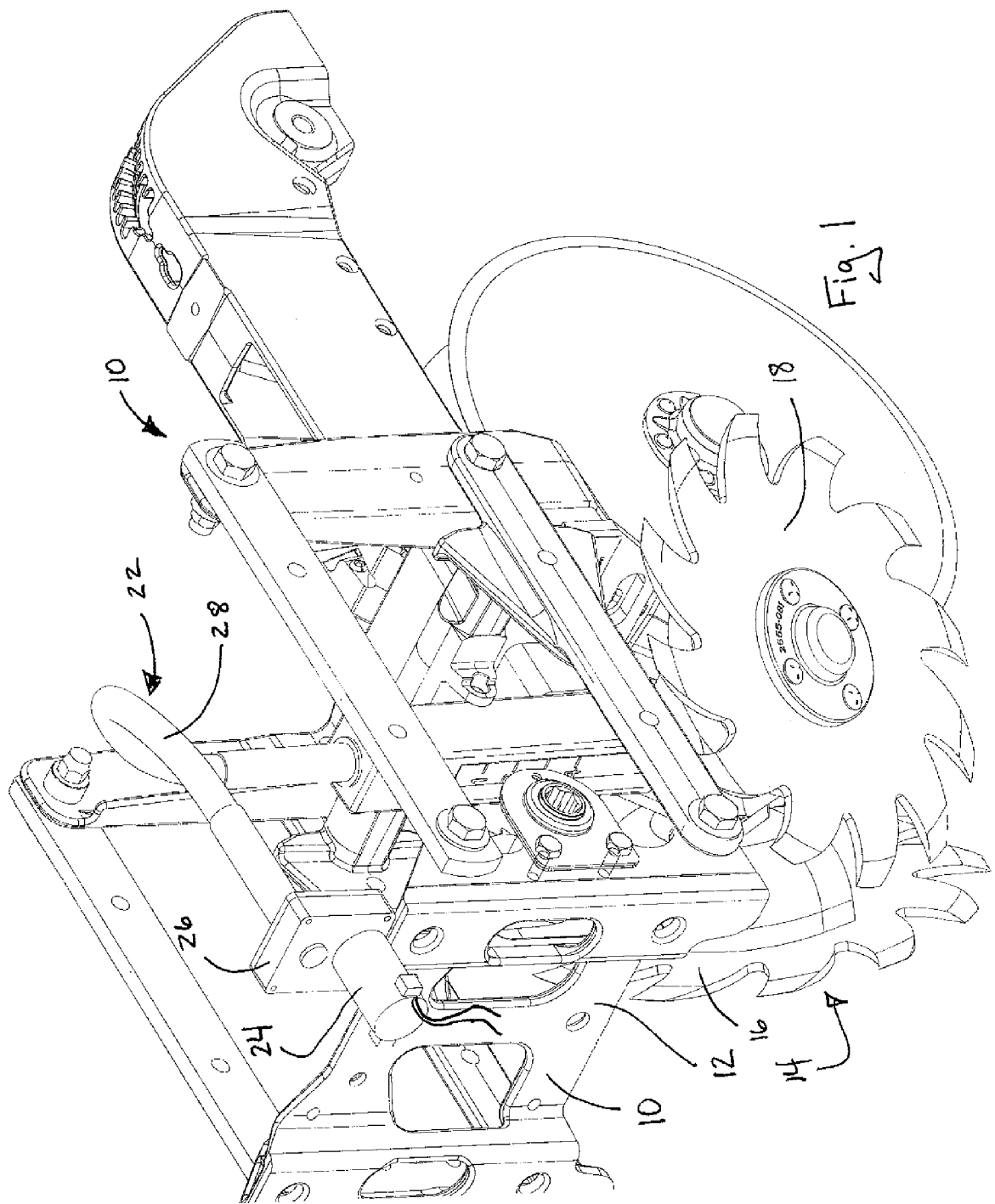
FIG. 1 is a perspective view of a portion of a planter unit having a residue manager and further showing an implement height adjuster coupled to the residue manager.

In illustrative embodiments, a field apparatus 10, such as a planter row unit, includes a frame 12 that is adapted to be coupled to a tractor or other motive power source, as shown, for example, in FIG. 1. The planter unit 10, in the illustrative embodiment, includes a residue manager 14 that is coupled to the planter unit 10. The residue manager 14 includes a pair of clearing discs 16, 18 that are adapted to displace crop residue. The residue manager 14 includes a height adjustment mechanism 20 that allows for the vertical adjustment of the clearing discs 16, 18 with respect to the ground. The change in vertical adjustment of the clearing discs 16, 18 allows for the operator to adjust for varying soil and field conditions. While the height adjustment mechanism 20 is shown coupled to a residue manager, it is contemplated that it can also be integrated into products that are utilized on various implements that require height adjustment including implements used for seeding, fertilizing, strip tillage, cultivating, soil fumigating, crop and tree transplanting, and soil additives.

Implement adjustment mechanism 22, of the present disclosure, is configured to be coupled to the height adjustment mechanism 20 of the residue manager 14, as shown, for example, in FIG. 1. Implement adjustment mechanism 22 includes an electric motor 24, a gear reduction transmission 26, and a power transfer unit 28, which rotates a threaded adjustment rod 30 of height adjustment mechanism 20, as shown in FIG. 2.

Figure 2:
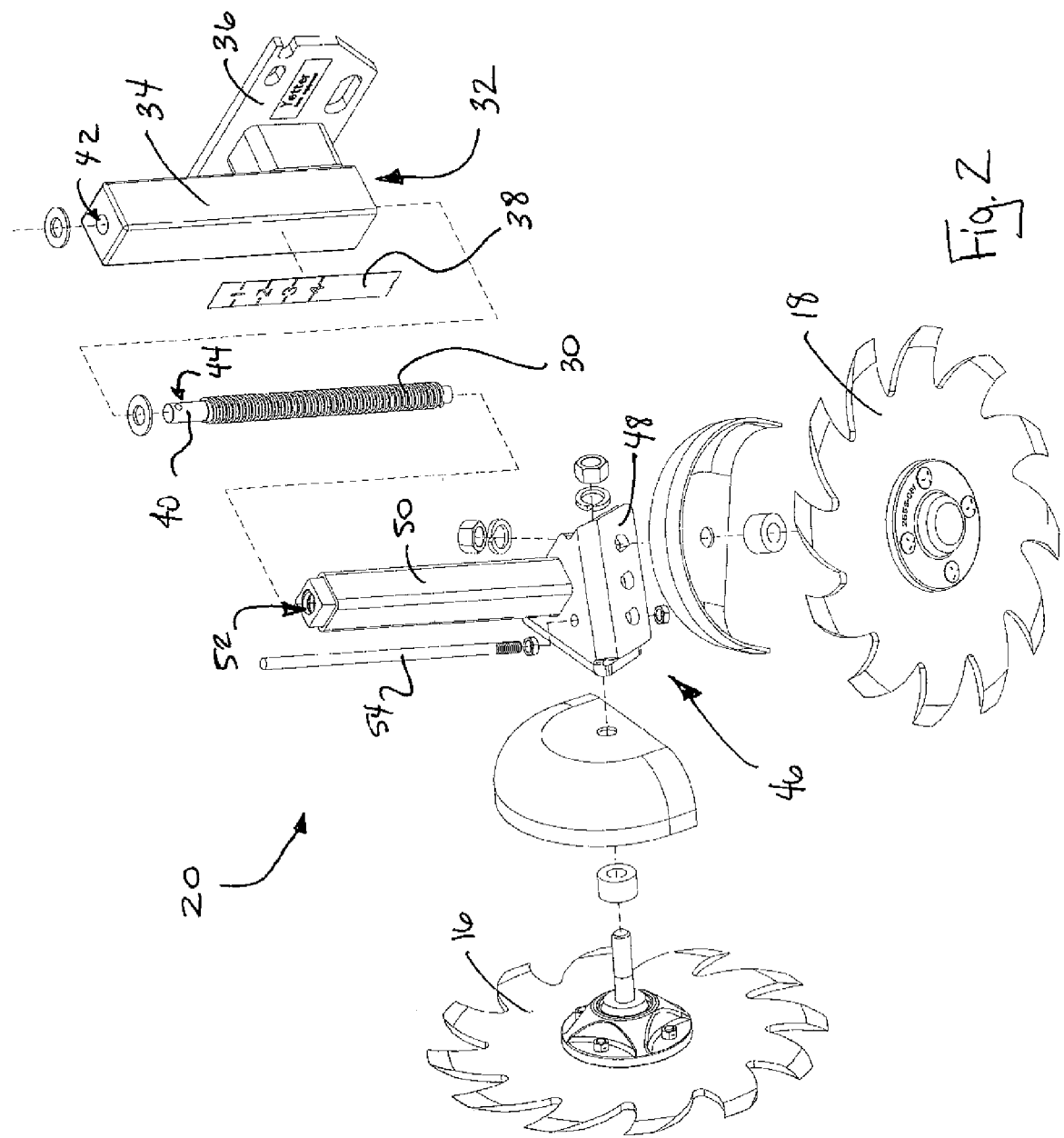
FIG. 2 is an exploded perspective view of the residue manager showing a pair of residue clearing discs and a height adjustment mechanism that includes an inner shaft, a threaded adjustment rod and an outer housing.

Height adjustment mechanism 20 includes a housing 32 that is provided with a housing tower 34 coupled to a bracket 36, as shown in FIG. 2. Housing tower 34 of housing 32 includes indicia 38 that provide a visual display of height increments so that the operator knows the position of the clearing discs 16, 18 with respect to the ground by viewing the indicia. Housing tower 34 of housing 32 is configured to accept threaded adjustment rod 30. Threaded adjustment rod 30 includes an upper end 40 that is configured to fit through opening 42 of housing tower 34. Upper end 40 of threaded adjustment rod 30 includes an aperture 44 that allows for connection of a power transfer unit 28.

Height adjustment mechanism 20 also includes disc support mechanism 46. Disc support mechanism 46 includes a base 48 that is configured to accept clearing discs 16, 18. Base 48 is wedge shaped to place clearing discs 16, 18 in a "toe-in" orientation. Disc support mechanism 46 also includes a support tube 50. Support tube 50 is coupled to base 48 and includes a threaded bore 52 adapted to accept threaded adjustment rod 30. Rotation of threaded adjustment rod 30 causes vertical movement of support tube 50 with respect to housing tower 34. Rotation of threaded adjustment rod 30 in a first direction causes support tube 50 to telescope from housing tower 34. Rotation of threaded adjustment rod 30 in a second direction causes support tube to move inside of housing tower 34. Disc support mechanism 46 also include a height indicator rod 54 that is positioned external to housing tower 34 and is positioned to lie near indicia 38. Movement of support tube 50 from housing tower 34 causes height indicator rod 54 to move downwardly, indicating the lower depth of the clearing discs 16, 18.

Figure 3:
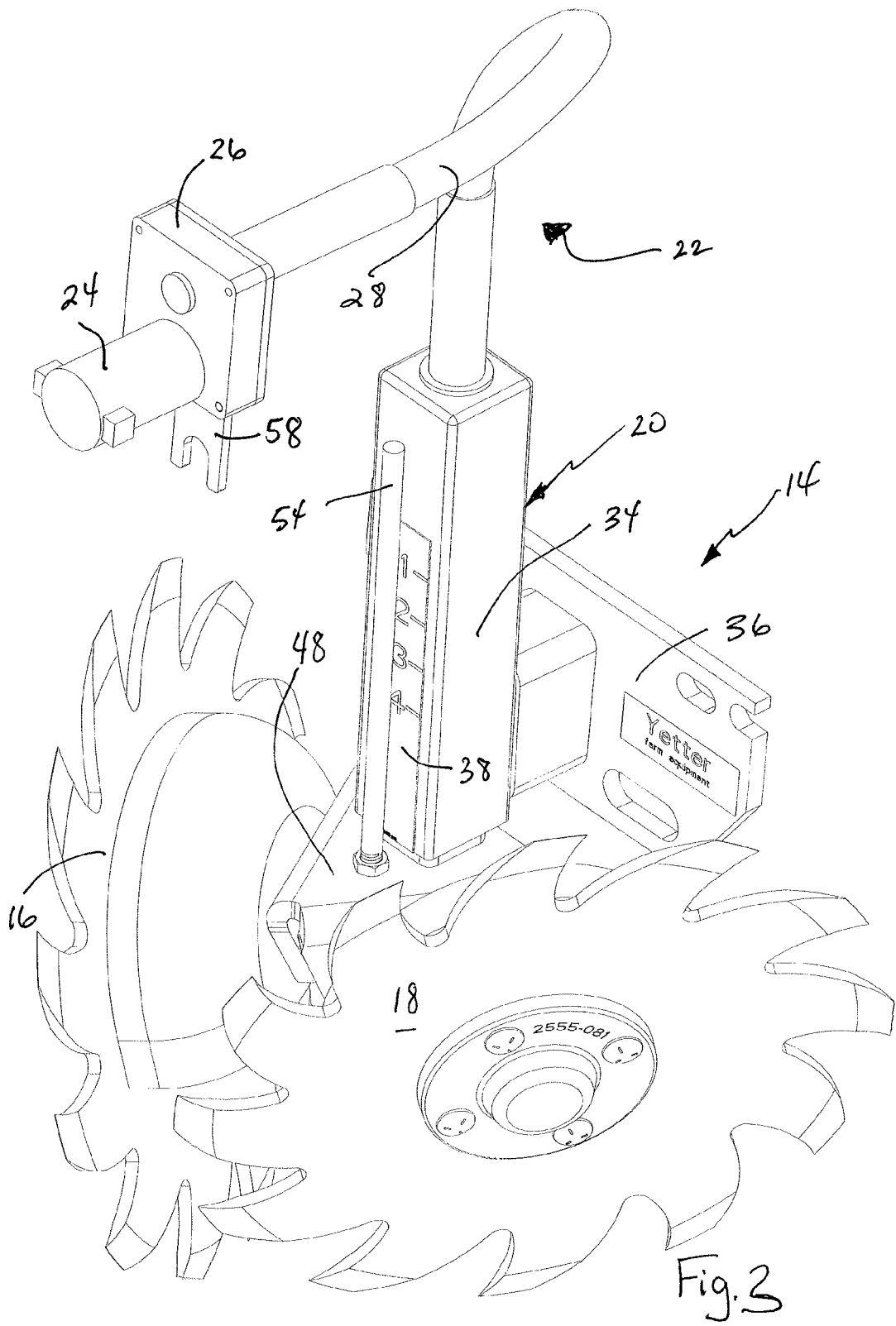
FIG. 3 is a perspective view of the implement adjustment mechanism coupled to the height adjustment mechanism of the residue manager showing an electric motor, a gear reduction transmission coupled to the electric motor, and a flexible output shaft, that is coupled to the transmission at a first end and to a threaded rod assembly of the residue manager at a second end.
Figure 4:
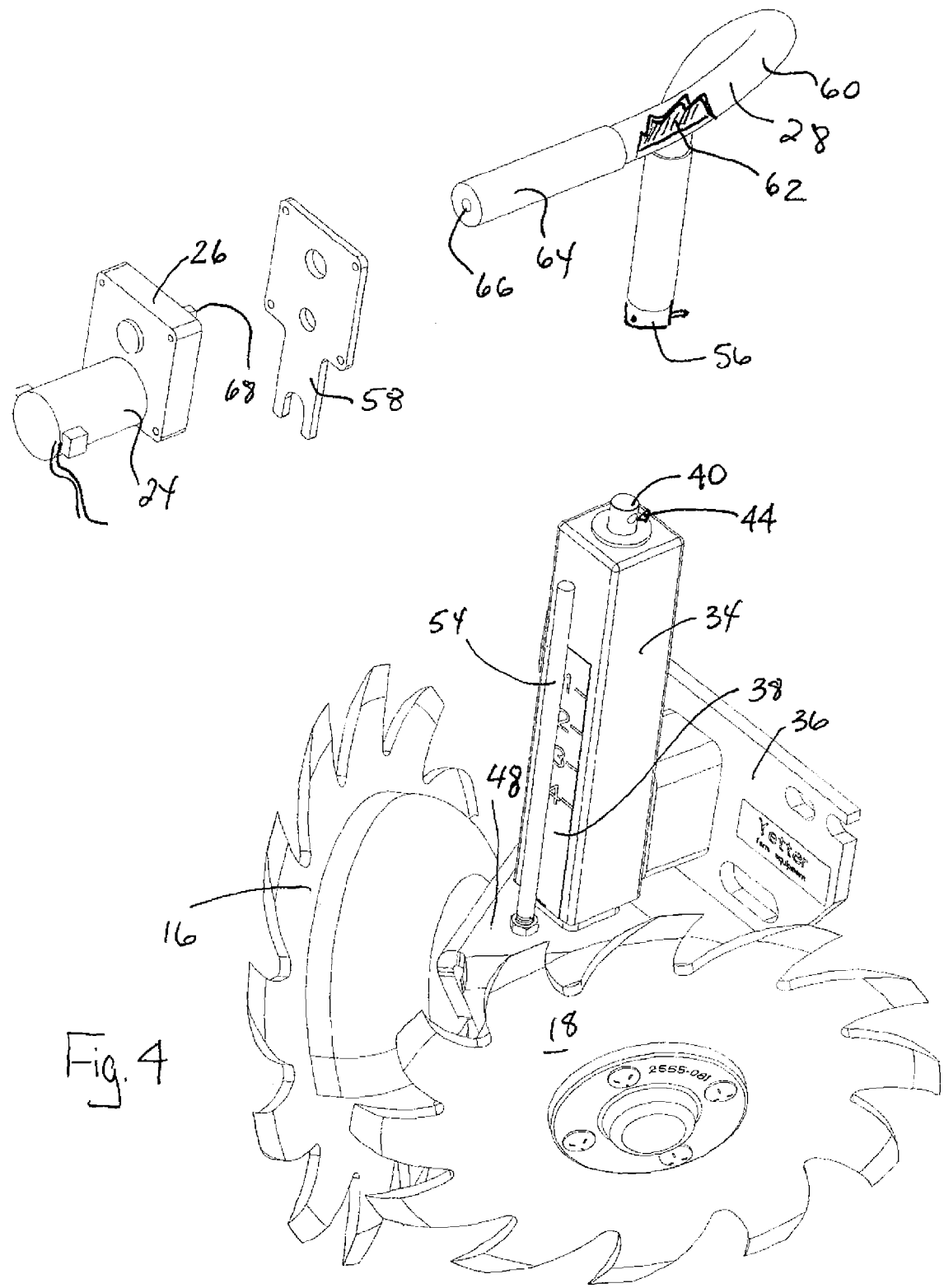
FIG. 4 is an exploded perspective view of the implement adjustment mechanism showing the electric motor coupled to the gear reduction transmission, a transmission mounting plate and the flexible output shaft.

FIG. 3 is a perspective view of the implement adjustment mechanism 22 coupled to the height adjustment mechanism 20 of the residue manager 14, as shown, for example, in FIGS. 3 and 4. Electric motor 24 is coupled to gear reduction transmission 26, which, in turn, is coupled to flexible output shaft 28. While an electric motor 24 is shown, it is contemplated that other types of motors could be used including hydraulic and pneumatic motors.

Power transfer unit 28, in turn, is coupled to upper end 40 of threaded adjustment rod 30. Power transfer unit 28 includes a coupler 56 that allows power transfer unit 28 to be coupled to upper end 40 of threaded adjustment rod 30. Implement adjustment mechanism 22 also includes bracket 58. Bracket 58 is used to secure gear reduction transmission 26 to planter row unit 10. Flexible output shaft 28 includes an outer jacket 60 that houses a flexible shaft 62. Flexible outer jacket 60 protects flexible shaft 62 from debris, moisture and other contaminants. Power transfer unit 28 includes a first end 64 that is provided with an input opening 66 that is configured to accept output shaft 68 of gear reduction transmission 26.

Gear reduction transmission 26 accepts pinion gear of electric motor 24. Gear reduction transmission includes one or more gears to allow output shaft 68 to turn at fewer or more revolutions per minute (RPMs) than the pinion gear of the electric motor 24. The gear reduction generates additional torque in the output shaft 68 so that a smaller motor can be used. Gear reduction transmission 26 also includes a position sensor that is used to determine the position of the clearing discs 16, 18. It is contemplated that the position sensor uses an optical reader that reads an encoder disc, which is coupled to one of the gears within the transmission.

It is also contemplated that the position sensor could use a Hall Effect sensor and a series of magnets mounted within the transmission in order to count the number of revolutions of the output shaft 68. The Hall Effect sensor creates a series of pulses that are counted by the processor in a control panel to determine the position of the clearing discs 16, 18. While the position sensor is described as located within the gear reduction transmission 26, it is contemplated that the position sensor could be also mounted on the electric motor 24 or the power transfer unit 28 or to the height adjustment mechanism 20.

Figure 5:
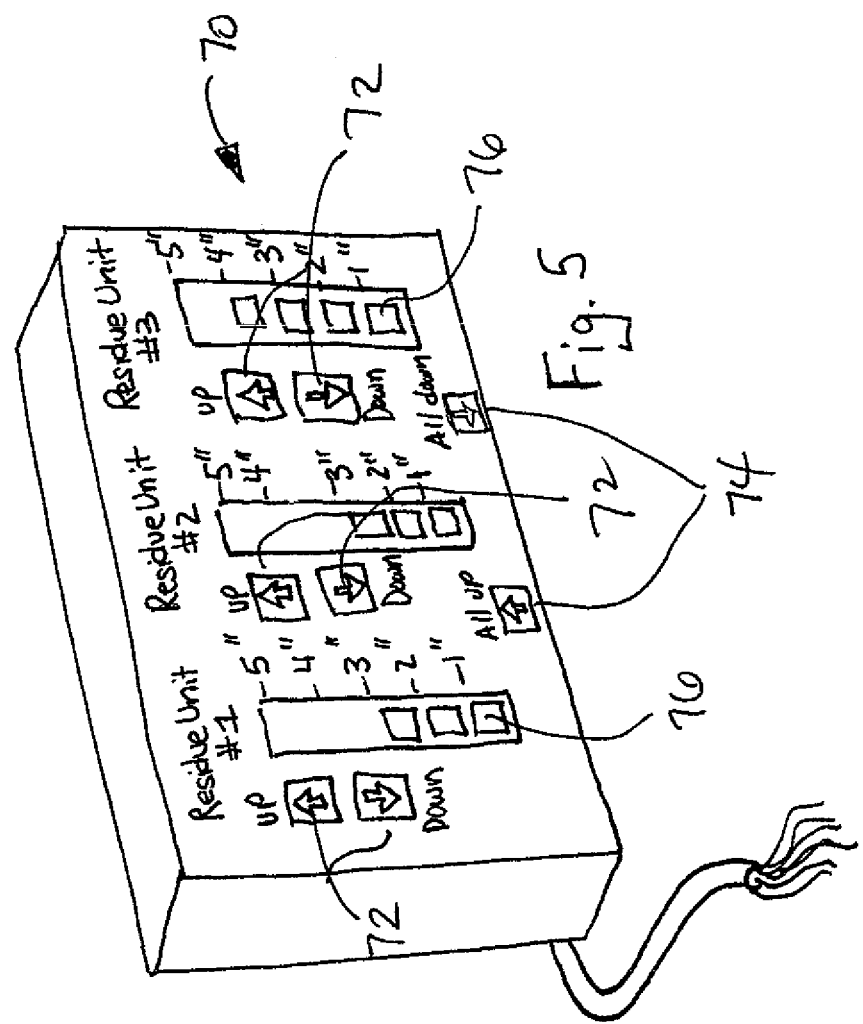
FIG. 5 is a perspective view of a representative control panel that displays the position of one or more residue managers and includes buttons to allow for selective vertical adjustment of the residue managers.
Figure 6:
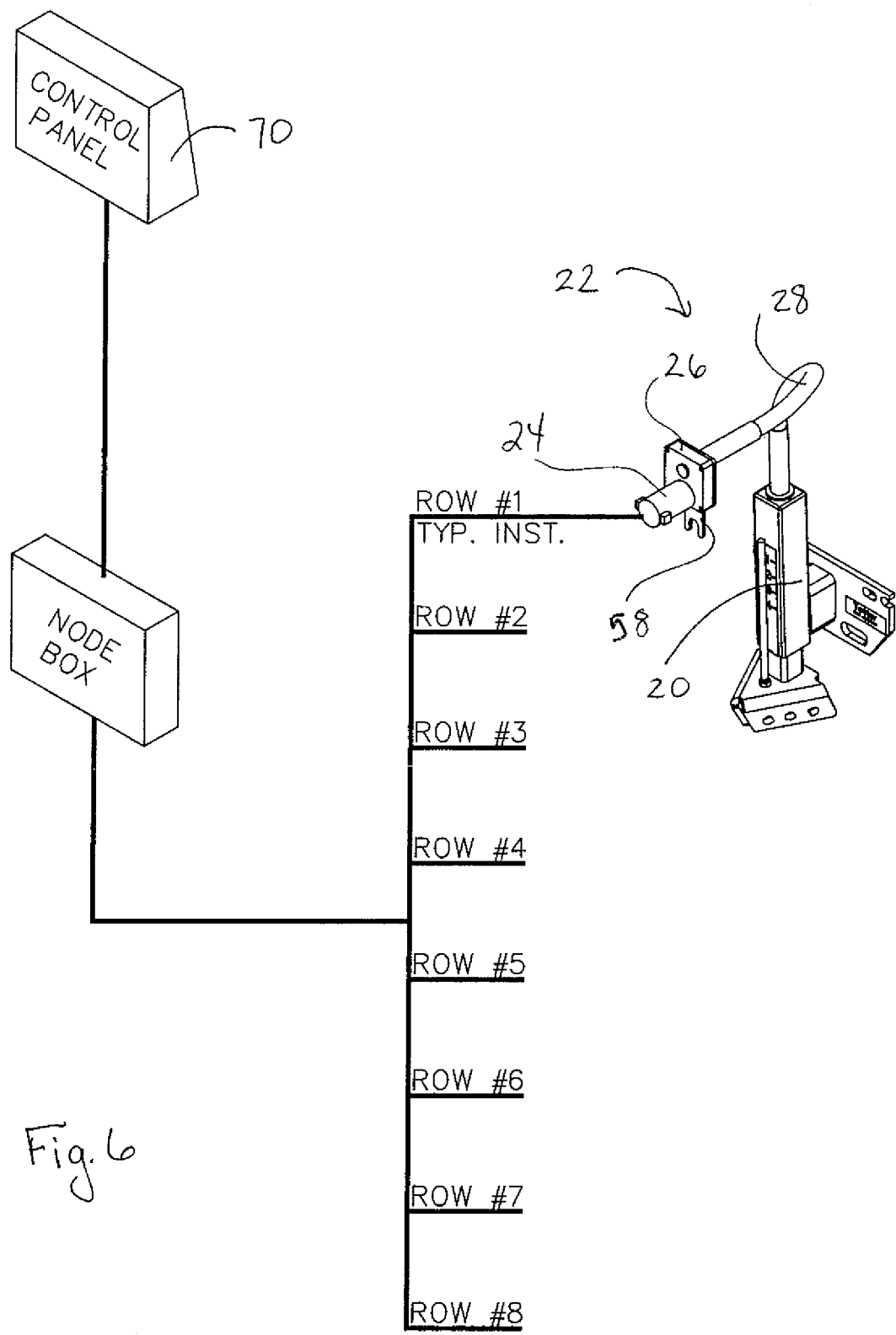
FIG. 6 is a diagram showing the connection of the implement adjustment mechanism to the control panel.

Power for the implement adjustment mechanism 22 may be by use of a separate power source, or by use of the tractor's 12 VDC electrical supply. Implement adjustment mechanism 22 is preferably controlled by a controller 70, as shown, for example, in FIG. 5. Controller 70 is electrically coupled to each implement adjustment mechanism 22 and can move the implement adjustment mechanisms 22 individually with respect to each other by use of buttons 72 or all together by use of buttons 74. The positions of the clearing discs 16, 18 are indicated by light emitting diodes (LEDs) 76. While LEDs are shown, it is contemplated that other indicating means could also be used including digits, including an LCD digital display.

Controller 70 has the ability to select the desired implement adjustment mechanism 22 to adjust and can adjust all of them at the same time or individually. The controller 70 has the ability to incrementally adjust the position of the height adjustment mechanism 20 through implement adjustment mechanism 22. The controller 70 also can save the settings provided by the user so that the user can quickly return to previous settings. The controller 70 also can self calibrate so that the full range of the height adjustment mechanism 20 is accounted for by the controller 70.

The implement adjustment mechanism 22 is adapted to be coupled to a field apparatus 10 secured to a motive power source, such as a tractor that is pulled in a forward direction over a field to treat soil. This would include tillage, debris removal and fertilization, among others. The implement adjustment mechanism 22 is configured to adjust the position of a farm implement, such as clearing discs 16, 18 with respect to the soil. The implement adjustment mechanism includes a height adjustment mechanism 20 coupled to the farm implement and the field apparatus 10. Height adjustment mechanism 20 is configured to move the farm implement in a first direction and a second direction that is the opposite of the first direction.

The implement adjustment mechanism 22 also includes an electric motor 24 that is rotatable in a first direct and a second direction and a transmission 26 coupled to the electric motor 24. The implement adjustment mechanism 22 also includes a power transfer unit 28 having a flexible outer casing and a flexible shaft 62 positioned within and rotatable with respect to the flexible outer jacket or casing 60. The power transfer unit 28 is coupled to the height adjustment mechanism 20 at a first end and to the transmission 26 at a second end. The flexible power transfer unit 28 is configured to flex to allow the mounting of the electric motor 24 and transmission 26 in multiple positions on the field apparatus 10 with respect to the height adjustment mechanism 20. Rotation of the electric motor 24 in a first direction causes the farm implement to move in a first direction and rotation of the electric motor 24 in a second direction causes the farm implement to move in a second direction.

The farm implement adjustment mechanism 22 further includes the controller 70. Controller 70 coupled to the electric motor 24 with wiring and is used to control the movement of the electric motor 24 and the position of the height adjustment mechanism 20. The implement adjustment mechanism 22 includes a position sensor that sends an output signal to the controller 70 so that the controller 70 can monitor the position and movement of the height adjustment mechanism 20. The controller 70 can make incremental adjustments to the height adjuster and can store past adjustment settings of the height adjuster to allow a user to return to those settings. The implement adjustment mechanism 22 incudes mount or bracket 58 for securing the electric motor 24 and the transmission 26 to the field apparatus remote from the height adjustment mechanism 22.

In use, an operator, while in the cab of the tractor, uses control panel 70 to raise and lower the clearing discs 16, 18. If the operator presses "up" button 74A, electric motor 24 rotates in a first direction to cause rotation of the gears in the gear reduction transmission 26, which rotate shaft 62 of power transfer unit 28. Rotation of flexible output shaft 28 causes rotation of threaded adjustment rod 30 to telescope disc support mechanism 46 from housing tower 34. As motor 24 rotates, position sensor sends signals to control panel 70 so that the processor of the control panel knows the position of the clearing discs 16, 18. If the operator presses "down"

Various features of the invention have been particularly shown and described in connection with the illustrative embodiment of the invention, however, it must be understood that these particular arrangements may merely illustrate, and that the invention is to be given its fullest interpretation.

What is claimed is:

1. A farm implement adjustment mechanism adapted to be coupled to a field apparatus secured to a motive power source that is pulled in a forward direction over a field to treat soil, the farm implement adjustment mechanism is configured to adjust the position a farm implement with respect to the soil, the farm implement adjustment mechanism comprising:
   a height adjuster coupled to the farm implement and the field apparatus, the height adjuster configured to move the farm implement in a first direction and a second direction that is the opposite of the first direction, the height adjuster having a base member that is adapted to accept the farm implement;
   the height adjuster having a generally vertical support tube coupled to the base member and a generally vertical housing tower that is adapted to accept at least a portion of the support tube within the housing tower;
   the height adjuster further including a generally vertical threaded rod positioned within the support tube, to permit adjustment of the support tube with respect to the housing tower;
   an electric motor;
   a transmission coupled to the electric motor;
   a power transfer unit having a flexible outer casing and a flexible shaft positioned within and rotatable with respect to the flexible outer casing, the power transfer unit being coupled to the threaded rod at a first end and to the transmission at a second end, the power transfer unit configured to flex to allow the mounting of the electric motor in multiple positions on the field apparatus with respect to the height adjuster; and
   wherein rotation of the electric motor in a first rotational direction causes the farm implement to move in the first direction and rotation of the electric motor in a second rotational direction causes the farm implement to move in the second direction.

2. The farm implement adjustment mechanism of claim 1, further comprising a controller that is coupled to the electric motor and used to control the movement of the height adjuster.

3. The farm implement adjustment mechanism of claim 2, further comprising a position sensor that sends an output signal to the controller so that the controller can monitor the position and movement of the height adjuster.

4. The farm implement adjustment mechanism of claim 3, wherein the controller can make incremental adjustments to the height adjuster.

5. The farm implement adjustment mechanism of claim, wherein the controller can store past adjustment settings of the height adjuster and return to those settings.

6. The farm implement adjustment mechanism of claim 1, further comprising a mount for securing the electric motor and the transmission to the field apparatus remote from the height adjuster.

7. The farm implement adjustment mechanism of claim 1, wherein the transmission is a gear reduction transmission used to increase the torque output of the electric motor.

8. The farm implement adjustment mechanism of claim 1, wherein the base member includes a generally vertical rod and the housing tower includes numbered indicia on an exterior surface, which are used to indicate the position of the farm implement.

9. The farm implement adjustment mechanism of claim 1, wherein the farm implement is a pair of clearing discs.

10. A farm implement adjustment mechanism adapted to be coupled to a field apparatus secured to a motive power source that is pulled in a forward direction over a field to treat soil, the farm implement adjustment mechanism is configured to adjust the position a farm implement with respect to the soil, the farm implement adjustment mechanism comprising:
    a height adjuster coupled to the farm implement and the field apparatus, the height adjuster configured to move the farm implement in a first direction and a second direction that is the opposite of the first direction, the height adjuster having a base member that is adapted to accept implement discs;
    the height adjuster having a generally vertical support tube coupled to the base member and a generally vertical housing tower that is adapted to accept at least a portion of the support tube within the housing tower;
    the height adjuster further including a generally vertical threaded rod positioned within the support tube, to permit adjustment of the support tube with respect to the housing tower;
    an electric motor;
    a transmission coupled to the electric motor;
    a mount for securing the electric motor or the transmission to the field apparatus;
    a power transfer unit having a flexible outer casing and a flexible shaft positioned within and rotatable with respect to the flexible outer casing, the power transfer unit being coupled to the threaded rod at a first end and to the transmission at a second end, the power transfer unit configured to flex to allow the mounting of the electric motor in multiple positions on the field apparatus with respect to the height adjuster;
    a controller that is coupled to the electric motor and used to control the movement of the height adjuster; and
    wherein rotation of the electric motor in a first rotational direction causes the farm implement to move in the first direction and rotation of the electric motor in a second rotational direction causes the farm implement to move in the second direction.

11. The farm implement adjustment mechanism of claim 10, wherein the controller can store past adjustment settings of the height adjuster and return to those settings.

12. The farm implement adjustment mechanism of claim 10, wherein the transmission is a gear reduction transmission used to increase the torque output of the electric motor.

13. The farm implement adjustment mechanism of claim 10, further comprising a position sensor that sends an output signal to the controller so that the controller can monitor the position and movement of the height adjuster.

14. The farm implement adjustment mechanism of claim 13, wherein the controller can make incremental adjustments to the height adjuster.

\* \* \* \* \*